US010455486B2

(12) United States Patent
Xu et al.

(10) Patent No.: US 10,455,486 B2
(45) Date of Patent: *Oct. 22, 2019

(54) METHOD AND APPARATUS FOR PERFORMING ACCESS CONTROL OR MEMBERSHIP VERIFICATION FOR DUAL CONNECTIVITY IN WIRELESS COMMUNICATION SYSTEM

(71) Applicant: LG ELECTRONICS INC., Seoul (KR)

(72) Inventors: Jian Xu, Seoul (KR); Daewook Byun, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/995,799

(22) Filed: Jun. 1, 2018

(65) Prior Publication Data

US 2018/0279215 A1   Sep. 27, 2018

Related U.S. Application Data

(63) Continuation of application No. 15/323,948, filed as application No. PCT/KR2015/007093 on Jul. 8, 2015, now Pat. No. 10,009,835.

(Continued)

(51) Int. Cl.
*H04W 48/16* (2009.01)
*H04W 8/18* (2009.01)
*H04W 76/15* (2018.01)

(52) U.S. Cl.
CPC .......... *H04W 48/16* (2013.01); *H04W 8/186* (2013.01); *H04W 76/15* (2018.02)

(58) Field of Classification Search
CPC ...... H04W 48/16; H04W 76/15; H04W 8/186
See application file for complete search history.

(56) References Cited

U.S. PATENT DOCUMENTS 10,009,835 B2    6/2018  Xu et al.
2013/0260768 A1  10/2013  Guo et al.
(Continued)

FOREIGN PATENT DOCUMENTS

CN   102123394   7/2011
CN   102202361   9/2011
(Continued)

OTHER PUBLICATIONS

3rd Generation Partnership Project, "Technical Specification Group Radio Access Network; Study on Small Cell enhancements for E-UTRA and E-UTRAN; Higher layer aspects (Release 12)", 3GPP TR 36.842 V12.0.0, Dec. 2013, 71 pages.
(Continued)

*Primary Examiner* — Ernest G Tacsik
(74) *Attorney, Agent, or Firm* — Lee Hong Degerman Kang Waimey

(57) ABSTRACT

A method and apparatus for performing access control and/or membership verification for dual connectivity in a wireless communication system is provided. A first evolved NodeB (eNB) transmits a closed subscriber group (CSG) membership status of a user equipment (UE) to a second eNB, which is a home eNB (HeNB), and receives at least one of a CSG identifier (ID) or a cell access mode of the second eNB from the second eNB. A mobility management entity (MME) may verify the CSG membership status of the UE and transmit the verified CSG membership status of the UE to the first eNB. And then, the first eNB transmits the verified CSG membership status of the UE to the second eNB.

10 Claims, 22 Drawing Sheets

Related U.S. Application Data

(60) Provisional application No. 62/143,830, filed on Apr. 7, 2015, provisional application No. 62/077,320, filed on Nov. 10, 2014, provisional application No. 62/021,721, filed on Jul. 8, 2014.

(56) References Cited

U.S. PATENT DOCUMENTS

| | | | |
|---|---|---|---|
| 2013/0308606 A1 | 11/2013 | Xu et al. | |
| 2013/0324170 A1 | 12/2013 | Watfa | |
| 2014/0080484 A1 | 3/2014 | Centonza et al. | |
| 2014/0155076 A1 | 6/2014 | Wang | |
| 2014/0171074 A1* | 6/2014 | Ganapathy | H04W 8/186 455/434 |
| 2014/0187246 A1 | 7/2014 | Jha et al. | |
| 2014/0323135 A1* | 10/2014 | Yang | H04W 48/02 455/438 |
| 2015/0304916 A1* | 10/2015 | Wang | H04W 36/04 455/436 |
| 2016/0150502 A1* | 5/2016 | Sebire | H04W 72/04 455/450 |
| 2017/0105128 A1* | 4/2017 | Chiba | H04W 24/02 |
| 2017/0230901 A1 | 8/2017 | Xu et al. | |

FOREIGN PATENT DOCUMENTS

| | | |
|---|---|---|
| CN | 103380635 | 10/2013 |
| CN | 104185227 | 12/2014 |
| CN | 106664644 | 5/2017 |
| WO | 2012146185 | 11/2012 |
| WO | 2013024654 | 2/2013 |
| WO | 2013045486 A1 | 4/2013 |
| WO | 2013126079 A1 | 8/2013 |
| WO | 2014034915 | 3/2014 |
| WO | 2014094582 | 6/2014 |

OTHER PUBLICATIONS

European Patent Office Application Serial No. 15818341.8, Search Report dated Dec. 20, 2017, 12 pages.

Japan Patent Office Application No. 2017-500943, Office Action dated Jan. 23, 2018, 2 pages.

NTT Docomo et al., "Stage 2 Changes for Dual Connectivity", 3GPP TSG RAN WG2 Meeting #85, R2-140049, Feb. 2014, 45 pages.

ZTE, "Motivation for Dual connectivity enhancements", 3GPP TSG RAN Meeting #64, RP-140719, Jun. 2014, 5 pages.

LG Electronics, "Text Proposal on membership verification for DC", 3GPP TSG RAN WG3 Meeting #88, R3-150938, May 2015, 6 pages.

Alcatel-Lucent et al., "New Path Switch procedure for Dual Connectivity", 3GPP TSG RAN WG3 Meeting #83bis, R3-140775, Apr. 2014, 5 pages.

U.S. Appl. No. 15/323,948, Office Action dated Sep. 20, 2017, 32 pages.

The State Intellectual Property Office of the People's Republic of China Application Serial No. 201580037389.X, Office Action dated Aug. 1, 2019, 8 pages.

* cited by examiner

METHOD AND APPARATUS FOR PERFORMING ACCESS CONTROL OR MEMBERSHIP VERIFICATION FOR DUAL CONNECTIVITY IN WIRELESS COMMUNICATION SYSTEM

CROSS-REFERENCE TO RELATED APPLICATIONS

This application is a continuation of U.S. patent application Ser. No. 15/323,948, filed on Jan. 4, 2017, now U.S. Pat. No. 10,009,835, which is the National Stage filing under 35 U.S.C. 371 of International Application No. PCT/KR2015/007093, filed on Jul. 8, 2015, which claims the benefit of U.S. Provisional Application No. 62/021,721, filed on Jul. 8, 2014, 62/077,320, filed on Nov. 10, 2014 and 62/143,830, filed on Apr. 7, 2015, the contents of which are all hereby incorporated by reference herein in their entirety.

BACKGROUND OF THE INVENTION

Field of the Invention

The present invention relates to wireless communications, and more particularly, to a method and apparatus for performing home evolved NodeB (HeNB) access control or membership verification for dual connectivity in a wireless communication system.

Related Art

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Small cells using low power nodes are considered promising to cope with mobile traffic explosion, especially for hotspot deployments in indoor and outdoor scenarios. A low-power node generally means a node whose transmission power is lower than macro node and base station (BS) classes, for example pico and femto evolved NodeB (eNB) are both applicable. Small cell enhancements for evolved UMTS terrestrial radio access (E-UTRA) and evolved UMTS terrestrial radio access network (E-UTRAN) will focus on additional functionalities for enhanced performance in hotspot areas for indoor and outdoor using low power nodes.

One of potential solutions for small cell enhancement, dual connectivity has been discussed. Dual connectivity is used to refer to operation where a given UE consumes radio resources provided by at least two different network points connected with non-ideal backhaul. Furthermore, each eNB involved in dual connectivity for a UE may assume different roles. Those roles do not necessarily depend on the eNB's power class and can vary among UEs. Dual connectivity may be one of potential solutions for small cell enhancement.

A home eNB (HeNB) has been specified with both S1 and X2 mobility possible from 3 GPP LTE rel-8 to rel-12. For HeNB, access control and/or membership verification may be performed for S1/X2 mobility. A method for performing access control and/or membership verification, when the HeNB is used as a secondary eNB (SeNB) in dual connectivity, may be required.

SUMMARY OF THE INVENTION

The present invention provides a method and apparatus for performing home evolved NodeB (HeNB) access control or membership verification for dual connectivity in a wireless communication system. The present invention provides a method and apparatus for performing access control and/or membership verification when a HeNB is used as a secondary eNB (SeNB) in dual connectivity.

In an aspect, a method for performing, by a first evolved NodeB (eNB), access control in a wireless communication system is provided. The method includes transmitting a closed subscriber group (CSG) membership status of a user equipment (UE) to a second eNB, which is a home eNB (HeNB), receiving at least one of a CSG identifier (ID) or a cell access mode of the second eNB from the second eNB, and transmitting a verified CSG membership status of the UE to the second eNB.

In another aspect, a method for performing, by a second evolved NodeB (eNB) which is a home eNB (HeNB), access control in a wireless communication system is provided. The method includes receiving a closed subscriber group (CSG) membership status of a user equipment (UE) from a first eNB, transmitting at least one of a CSG identifier (ID), a cell access mode of the second eNB, or a public land mobile network (PLMN) ID of the second eNB to the first eNB, and receiving a verified CSG membership status of the UE from the first eNB.

When a HeNB is used as a SeNB in dual connectivity, access control and/or membership verification may be performed efficiently.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802-20, evolved UTRA (E-UTRA), etc. IEEE 802.16m is an evolution of IEEE 802.16e, and provides backward compatibility with an IEEE 802.16-based system. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in downlink and uses the SC-FDMA in uplink. LTE-advance (LTE-A) is an evolution of the 3GPP LTE.

For clarity, the following description will focus on the LTE-A. However, technical features of the present invention are not limited thereto.

Figure 1:
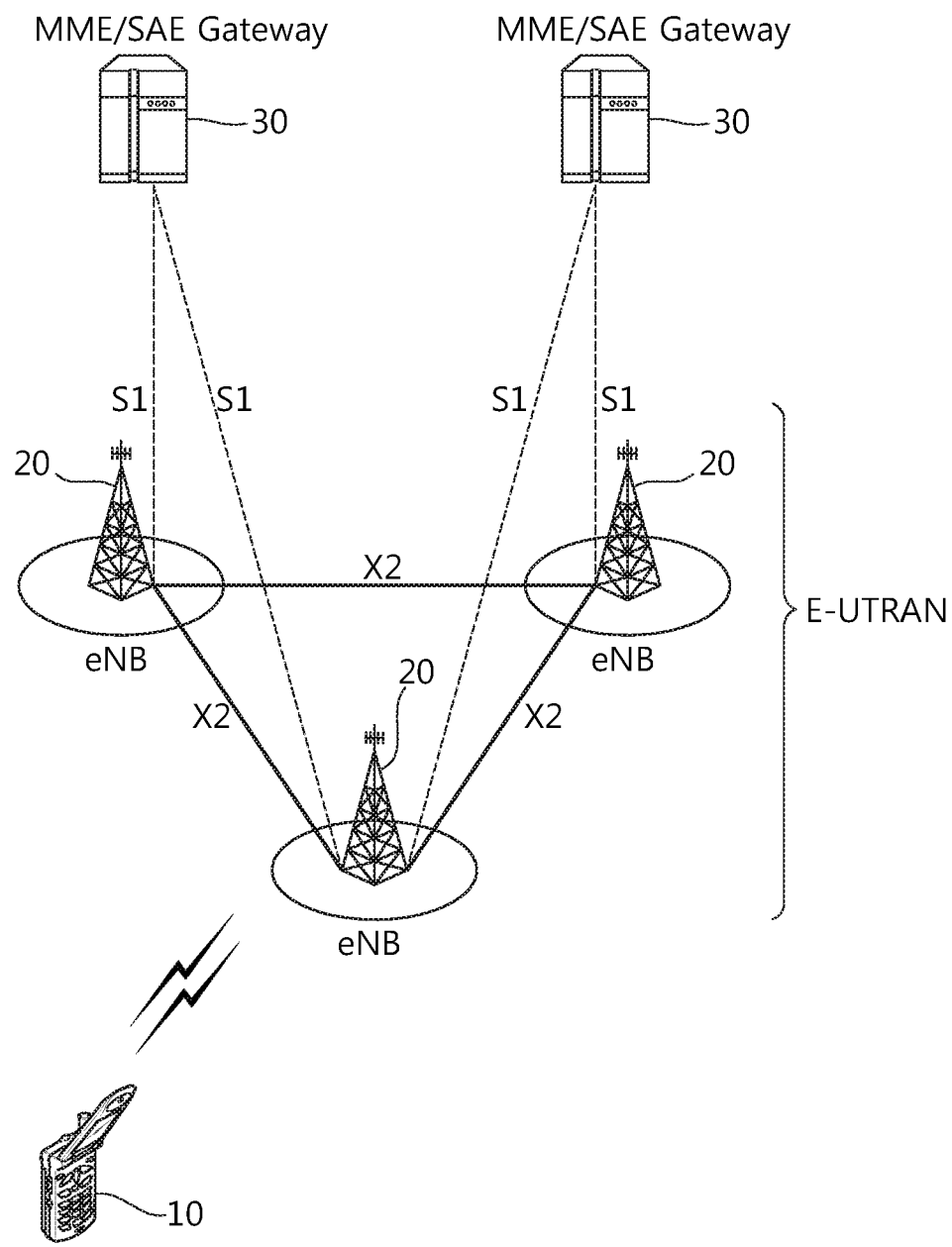
FIG. 1 shows LTE system architecture.

FIG. 1 shows LTE system architecture. The communication network is widely deployed to provide a variety of communication services such as voice over internet protocol (VoIP) through IMS and packet data.

Referring to FIG. 1, the LTE system architecture includes one or more user equipment (UE; 10), an evolved-UMTS terrestrial radio access network (E-UTRAN) and an evolved packet core (EPC). The UE 10 refers to a communication equipment carried by a user. The UE 10 may be fixed or mobile, and may be referred to as another terminology, such as a mobile station (MS), a user terminal (UT), a subscriber station (SS), a wireless device, etc.

The E-UTRAN includes one or more evolved node-B (eNB) 20, and a plurality of UEs may be located in one cell. The eNB 20 provides an end point of a control plane and a user plane to the UE 10. The eNB 20 is generally a fixed station that communicates with the UE 10 and may be referred to as another terminology, such as a base station (BS), an access point, etc. One eNB 20 may be deployed per cell.

Hereinafter, a downlink (DL) denotes communication from the eNB 20 to the UE 10, and an uplink (UL) denotes communication from the UE 10 to the eNB 20. In the DL, a transmitter may be a part of the eNB 20, and a receiver may be a part of the UE 10. In the UL, the transmitter may be a part of the UE 10, and the receiver may be a part of the eNB 20.

The EPC includes a mobility management entity (MME) and a system architecture evolution (SAE) gateway (S-GW). The MME/S-GW 30 may be positioned at the end of the network and connected to an external network. For clarity, MME/S-GW 30 will be referred to herein simply as a "gateway," but it is understood that this entity includes both the MME and S-GW.

The MME provides various functions including non-access stratum (NAS) signaling to eNBs 20, NAS signaling security, access stratum (AS) security control, inter core network (CN) node signaling for mobility between 3GPP access networks, idle mode UE reachability (including control and execution of paging retransmission), tracking area list management (for UE in idle and active mode), packet data network (PDN) gateway (P-GW) and S-GW selection, MME selection for handovers with MME change, serving GPRS support node (SGSN) selection for handovers to 2G or 3G 3GPP access networks, roaming, authentication, bearer management functions including dedicated bearer establishment, support for public warning system (PWS) (which includes earthquake and tsunami warning system (ETWS) and commercial mobile alert system (CMAS)) message transmission. The S-GW host provides assorted functions including per-user based packet filtering (by e.g., deep packet inspection), lawful interception, UE Internet protocol (IP) address allocation, transport level packet marking in the DL, UL and DL service level charging, gating and rate enforcement, DL rate enforcement based on access point name aggregate maximum bit rate (APN-AMBR).

Interfaces for transmitting user traffic or control traffic may be used. The UE 10 is connected to the eNB 20 via a Uu interface. The eNBs 20 are connected to each other via an X2 interface. Neighboring eNBs may have a meshed network structure that has the X2 interface. A plurality of nodes may be connected between the eNB 20 and the gateway 30 via an S1 interface.

Figure 2:
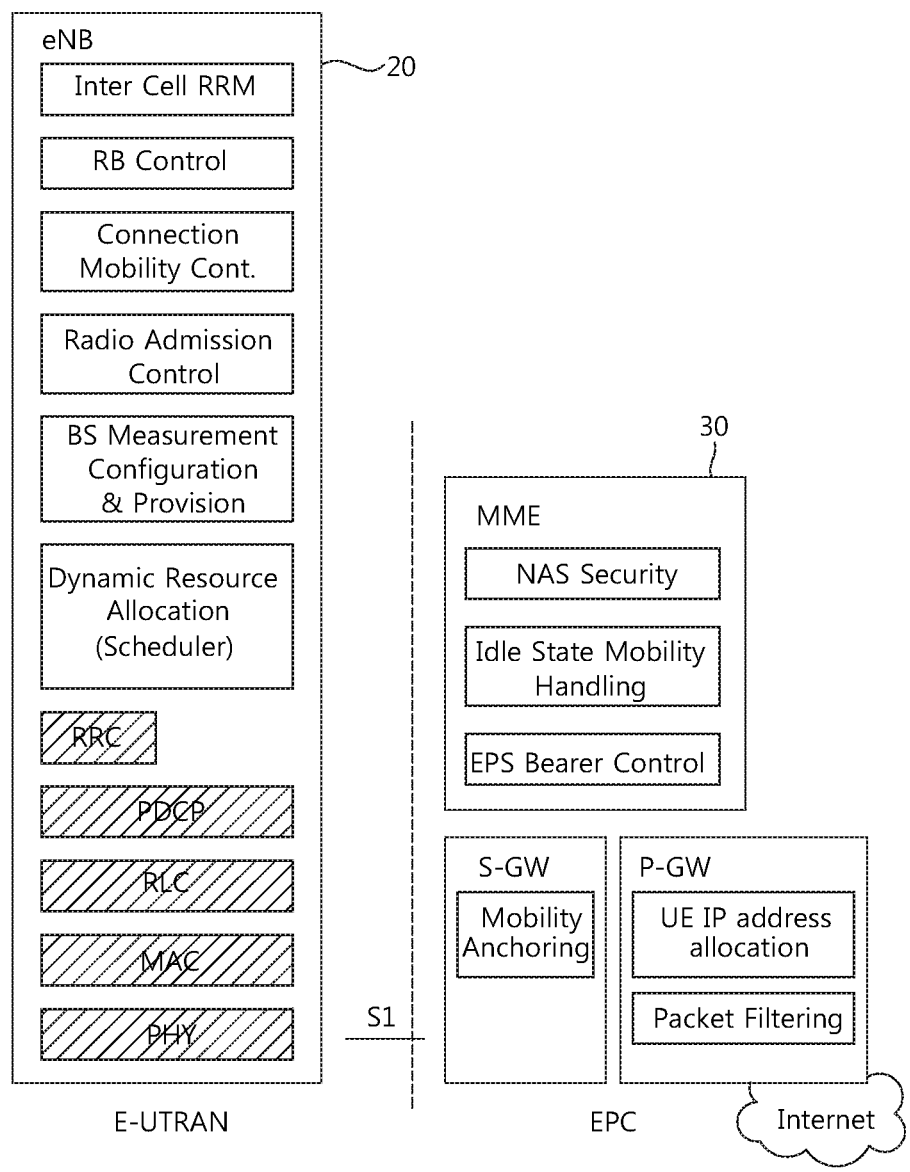
FIG. 2 shows a block diagram of architecture of a typical E-UTRAN and a typical EPC.

FIG. 2 shows a block diagram of architecture of a typical E-UTRAN and a typical EPC. Referring to FIG. 2, the eNB 20 may perform functions of selection for gateway 30, routing toward the gateway 30 during a radio resource control (RRC) activation, scheduling and transmitting of paging messages, scheduling and transmitting of broadcast channel (BCH) information, dynamic allocation of resources to the UEs 10 in both UL and DL, configuration and provisioning of eNB measurements, radio bearer control, radio admission control (RAC), and connection mobility control in LTE ACTIVE state. In the EPC, and as noted above, gateway 30 may perform functions of paging origination, LTE IDLE state management, ciphering of the user plane, SAE bearer control, and ciphering and integrity protection of NAS signaling.

Figure 3:
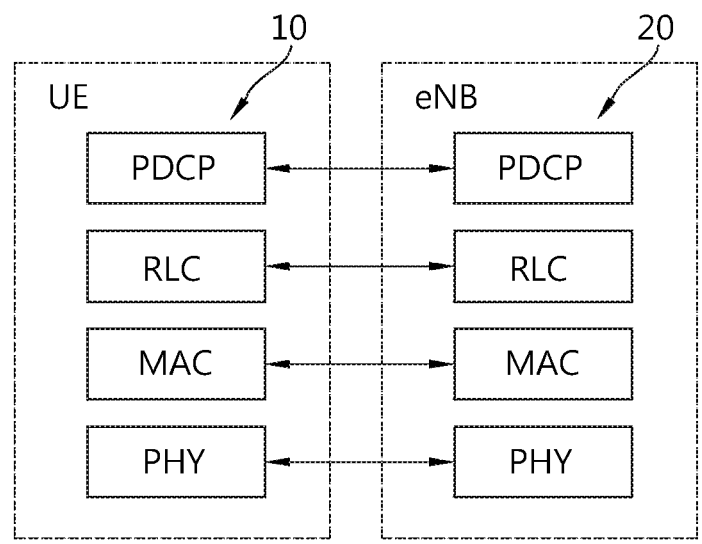
FIG. 3 shows a block diagram of a user plane protocol stack of an LTE system.
Figure 4:
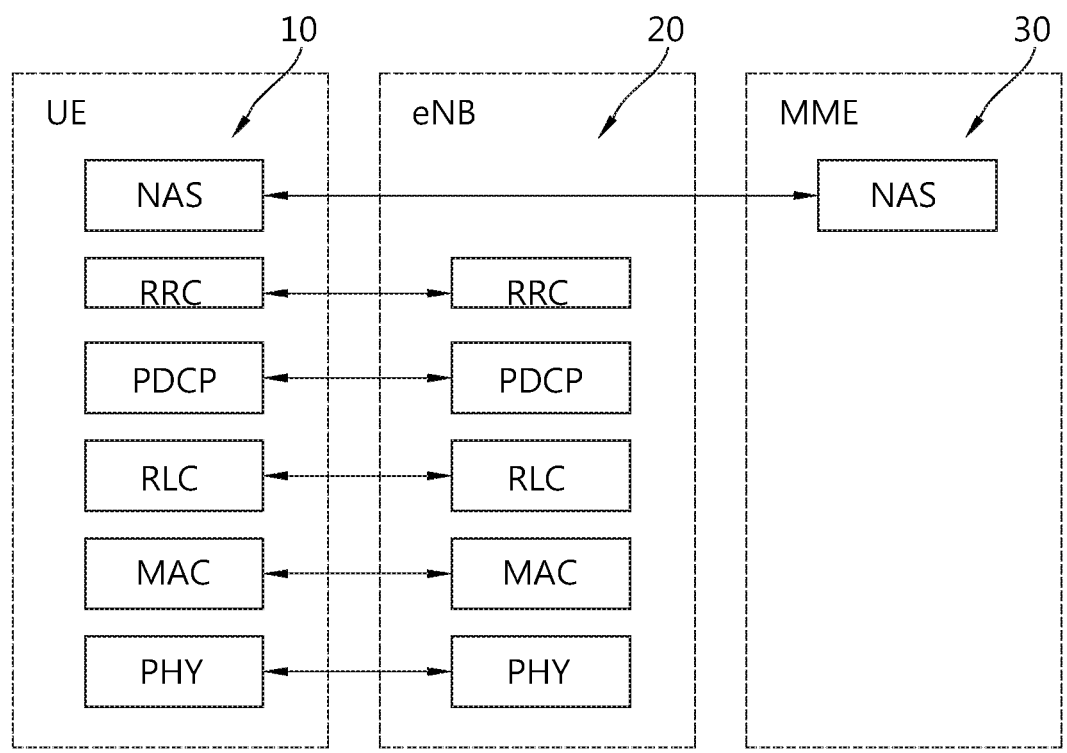
FIG. 4 shows a block diagram of a control plane protocol stack of an LTE system.

FIG. 3 shows a block diagram of a user plane protocol stack of an LTE system. FIG. 4 shows a block diagram of a control plane protocol stack of an LTE system. Layers of a radio interface protocol between the UE and the E-UTRAN may be classified into a first layer (L1), a second layer (L2), and a third layer (L3) based on the lower three layers of the open system interconnection (OSI) model that is well-known in the communication system.

A physical (PHY) layer belongs to the L1. The PHY layer provides a higher layer with an information transfer service through a physical channel. The PHY layer is connected to a medium access control (MAC) layer, which is a higher layer of the PHY layer, through a transport channel. A physical channel is mapped to the transport channel. Data between the MAC layer and the PHY layer is transferred through the transport channel. Between different PHY layers, i.e., between a PHY layer of a transmission side and a PHY layer of a reception side, data is transferred via the physical channel.

A MAC layer, a radio link control (RLC) layer, and a packet data convergence protocol (PDCP) layer belong to the L2. The MAC layer provides services to the RLC layer, which is a higher layer of the MAC layer, via a logical channel. The MAC layer provides data transfer services on logical channels. The RLC layer supports the transmission of data with reliability. Meanwhile, a function of the RLC layer may be implemented with a functional block inside the MAC layer. In this case, the RLC layer may not exist. The PDCP layer provides a function of header compression function that reduces unnecessary control information such that data being transmitted by employing IP packets, such as IPv4 or IPv6, can be efficiently transmitted over a radio interface that has a relatively small bandwidth.

A radio resource control (RRC) layer belongs to the L3. The RLC layer is located at the lowest portion of the L3, and is only defined in the control plane. The RRC layer controls logical channels, transport channels, and physical channels in relation to the configuration, reconfiguration, and release of radio bearers (RBs). The RB signifies a service provided the L2 for data transmission between the UE and E-UTRAN.

Referring to FIG. 3, the RLC and MAC layers (terminated in the eNB on the network side) may perform functions such as scheduling, automatic repeat request (ARQ), and hybrid ARQ (HARQ). The PDCP layer (terminated in the eNB on the network side) may perform the user plane functions such as header compression, integrity protection, and ciphering.

Referring to FIG. 4, the RLC and MAC layers (terminated in the eNB on the network side) may perform the same functions for the control plane. The RRC layer (terminated in the eNB on the network side) may perform functions such as broadcasting, paging, RRC connection management, RB control, mobility functions, and UE measurement reporting and controlling. The NAS control protocol (terminated in the MME of gateway on the network side) may perform functions such as a SAE bearer management, authentication, LTE IDLE mobility handling, paging origination in LTE IDLE, and security control for the signaling between the gateway and UE.

Figure 5:
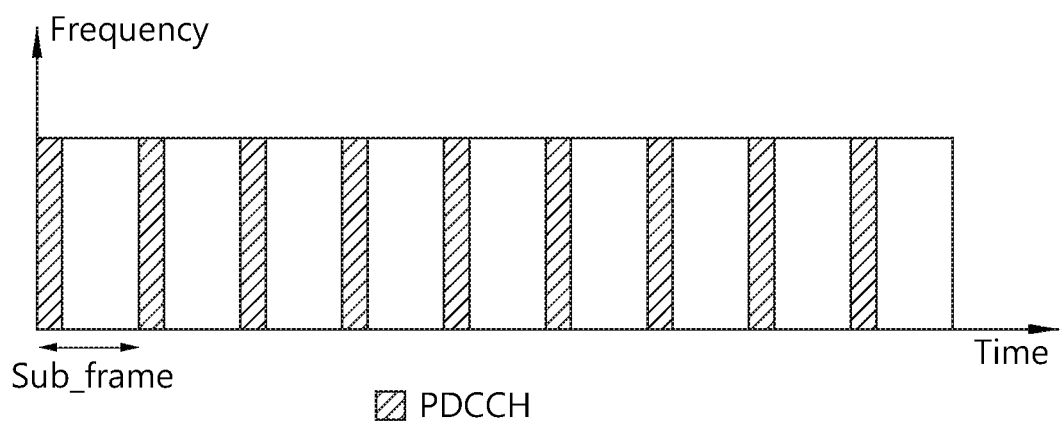
FIG. 5 shows an example of a physical channel structure.

FIG. 5 shows an example of a physical channel structure. A physical channel transfers signaling and data between PHY layer of the UE and eNB with a radio resource. A physical channel consists of a plurality of subframes in time domain and a plurality of subcarriers in frequency domain. One subframe, which is 1 ms, consists of a plurality of symbols in the time domain. Specific symbol(s) of the subframe, such as the first symbol of the subframe, may be used for a physical downlink control channel (PDCCH). The PDCCH carries dynamic allocated resources, such as a physical resource block (PRB) and modulation and coding scheme (MCS).

A DL transport channel includes a broadcast channel (BCH) used for transmitting system information, a paging channel (PCH) used for paging a UE, a downlink shared channel (DL-SCH) used for transmitting user traffic or control signals, a multicast channel (MCH) used for multicast or broadcast service transmission. The DL-SCH supports HARQ, dynamic link adaptation by varying the modulation, coding and transmit power, and both dynamic and semi-static resource allocation. The DL-SCH also may enable broadcast in the entire cell and the use of beamforming.

A UL transport channel includes a random access channel (RACH) normally used for initial access to a cell, a uplink shared channel (UL-SCH) for transmitting user traffic or control signals, etc. The UL-SCH supports HARQ and dynamic link adaptation by varying the transmit power and potentially modulation and coding. The UL-SCH also may enable the use of beamforming.

The logical channels are classified into control channels for transferring control plane information and traffic channels for transferring user plane information, according to a type of transmitted information. That is, a set of logical channel types is defined for different data transfer services offered by the MAC layer.

The control channels are used for transfer of control plane information only. The control channels provided by the MAC layer include a broadcast control channel (BCCH), a paging control channel (PCCH), a common control channel (CCCH), a multicast control channel (MCCH) and a dedicated control channel (DCCH). The BCCH is a downlink channel for broadcasting system control information. The PCCH is a downlink channel that transfers paging information and is used when the network does not know the location cell of a UE. The CCCH is used by UEs having no RRC connection with the network. The MCCH is a point-to-multipoint downlink channel used for transmitting multimedia broadcast multicast services (MBMS) control information from the network to a UE. The DCCH is a point-to-point bi-directional channel used by UEs having an RRC connection that transmits dedicated control information between a UE and the network.

Traffic channels are used for the transfer of user plane information only. The traffic channels provided by the MAC layer include a dedicated traffic channel (DTCH) and a multicast traffic channel (MTCH). The DTCH is a point-to-point channel, dedicated to one UE for the transfer of user information and can exist in both uplink and downlink. The MTCH is a point-to-multipoint downlink channel for transmitting traffic data from the network to the UE.

Uplink connections between logical channels and transport channels include the DCCH that can be mapped to the UL-SCH, the DTCH that can be mapped to the UL-SCH and the CCCH that can be mapped to the UL-SCH. Downlink connections between logical channels and transport channels include the BCCH that can be mapped to the BCH or DL-SCH, the PCCH that can be mapped to the PCH, the DCCH that can be mapped to the DL-SCH, and the DTCH that can be mapped to the DL-SCH, the MCCH that can be mapped to the MCH, and the MTCH that can be mapped to the MCH.

An RRC state indicates whether an RRC layer of the UE is logically connected to an RRC layer of the E-UTRAN. The RRC state may be divided into two different states such as an RRC idle state (RRC_IDLE) and an RRC connected state (RRC_CONNECTED). In RRC_IDLE, the UE may receive broadcasts of system information and paging information while the UE specifies a discontinuous reception (DRX) configured by NAS, and the UE has been allocated an identification (ID) which uniquely identifies the UE in a tracking area and may perform public land mobile network (PLMN) selection and cell re-selection. Also, in RRC_IDLE, no RRC context is stored in the eNB.

In RRC_CONNECTED, the UE has an E-UTRAN RRC connection and a context in the E-UTRAN, such that transmitting and/or receiving data to/from the eNB becomes possible. Also, the UE can report channel quality information and feedback information to the eNB. In RRC_CONNECTED, the E-UTRAN knows the cell to which the UE belongs. Therefore, the network can transmit and/or receive data to/from UE, the network can control mobility (handover and inter-radio access technologies (RAT) cell change order to GSM EDGE radio access network (GERAN) with network assisted cell change (NACC)) of the UE, and the network can perform cell measurements for a neighboring cell.

In RRC_IDLE, the UE specifies the paging DRX cycle. Specifically, the UE monitors a paging signal at a specific paging occasion of every UE specific paging DRX cycle. The paging occasion is a time interval during which a paging signal is transmitted. The UE has its own paging occasion. A paging message is transmitted over all cells belonging to the same tracking area. If the UE moves from one tracking area (TA) to another TA, the UE will send a tracking area update (TAU) message to the network to update its location.

Overall architecture and network interface for dual connectivity (DC) is described. It may be referred to 3GPP TR 36.842 V12.0.0 (2013 December). The E-UTRAN may supports dual connectivity operation whereby a multiple RX/TX UE in RRC_CONNECTED is configured to utilize radio resources provided by two distinct schedulers, located in two eNBs connected via a non-ideal backhaul over the X2 interface. The overall E-UTRAN architecture described in FIG. 1 is applicable for dual connectivity as well. Two different roles may be assumed to eNBs involved in dual connectivity for a certain UE: an eNB may either act as a master eNB (MeNB) or as a secondary eNB (SeNB). The MeNB is the eNB which terminates at least S1-MME in dual connectivity. The SeNB is the eNB that is providing additional radio resources for the UE but is not the MeNB in dual connectivity. In dual connectivity a UE is connected to one MeNB and one SeNB.

Figure 6:
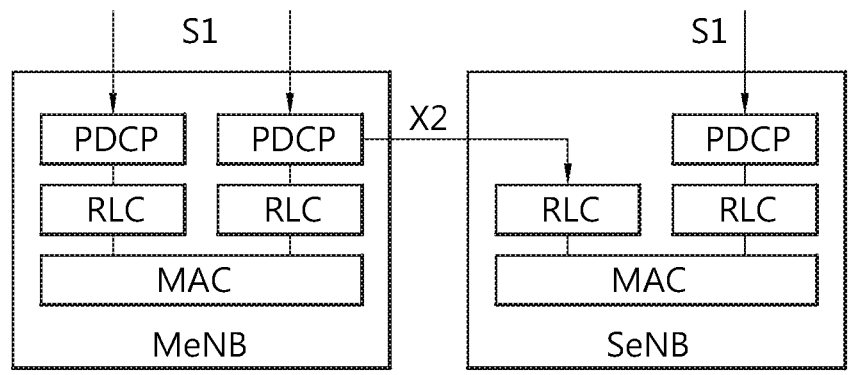
FIG. 6 shows radio protocol architecture for dual connectivity.

FIG. 6 shows radio protocol architecture for dual connectivity. In DC, the radio protocol architecture that a particular bearer uses depends on how the bearer is setup. Three alternatives exist, master cell group (MCG) bearer, secondary cell group (SCG) bearer and split bearer. Referring to FIG. 6, those three alternatives are depicted, i.e. in order of the MCG bearer, split bearer and SCG bearer from left to right. The MCG bearer is a bearer whose radio protocols are only located in the MeNB to use MeNB resources only in dual connectivity. The SCG bearer is a bearer whose radio protocols are only located in the SeNB to use SeNB resources in dual connectivity. The split bearer is a bearer whose radio protocols are located in both the MeNB and the SeNB to use both MeNB and SeNB resources in dual connectivity. Signaling radio bearers (SRBs) are always of the MCG bearer and therefore only use the radio resources provided by the MeNB. The MCG is a group of serving cells associated with the MeNB, comprising of the primary cell (PCell) and optionally one or more secondary cells (SCells) in dual connectivity. The SCG is a group of serving cells associated with the SeNB, comprising of primary SCell (PSCell) and optionally one or more SCells in dual connectivity. DC may also be described as having at least one bearer configured to use radio resources provided by the SeNB.

Figure 7:
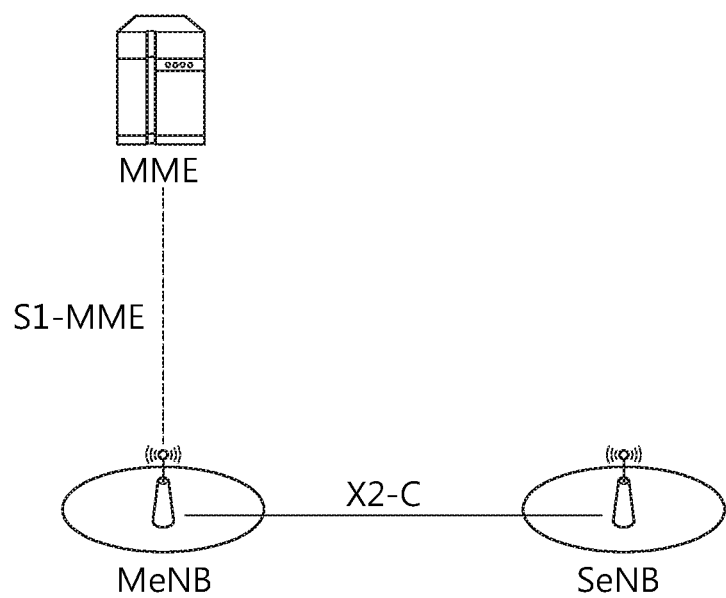
FIG. 7 shows C-plane connectivity of eNBs involved in dual connectivity for a certain UE.

FIG. 7 shows C-plane connectivity of eNBs involved in dual connectivity for a certain UE. Inter-eNB control plane signaling for dual connectivity is performed by means of X2 interface signaling. Control plane signaling towards the MME is performed by means of S1 interface signaling. There is only one S1-MME connection per UE between the MeNB and the MME. Each eNB should be able to handle UEs independently, i.e. provide the PCell to some UEs while providing SCell(s) for SCG to others. Each eNB involved in dual connectivity for a certain UE owns its radio resources and is primarily responsible for allocating radio resources of its cells, respective coordination between MeNB and SeNB is performed by means of X2 interface signaling. Referring to FIG. 7, the MeNB is C-plane connected to the MME via S1-MME, the MeNB and the SeNB are interconnected via X2-C.

Figure 8:
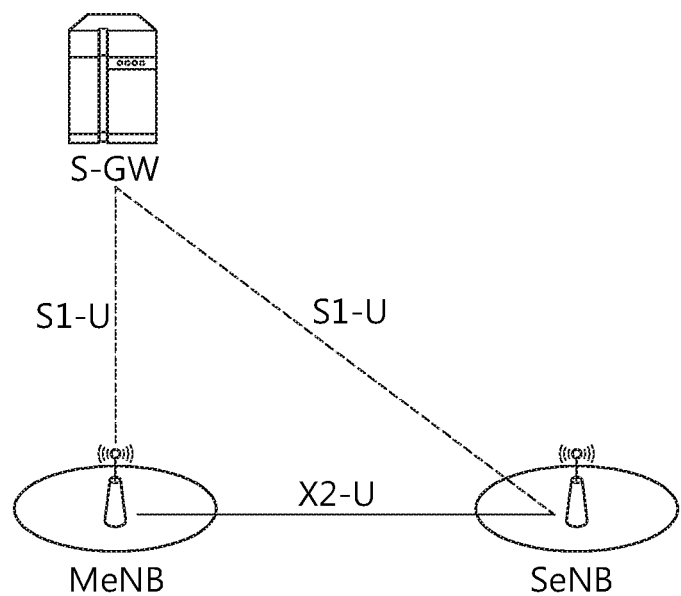
FIG. 8 shows U-plane connectivity of eNBs involved in dual connectivity for a certain UE.

FIG. 8 shows U-plane connectivity of eNBs involved in dual connectivity for a certain UE. U-plane connectivity depends on the bearer option configured. For MCG bearers, the MeNB is U-plane connected to the S-GW via S1-U, the SeNB is not involved in the transport of user plane data. For split bearers, the MeNB is U-plane connected to the S-GW via S1-U and in addition, the MeNB and the SeNB are interconnected via X2-U. For SCG bearers, the SeNB is directly connected with the S-GW via S1-U. If only MCG and split bearers are configured, there is no S1-U termination in the SeNB.

Figure 9:
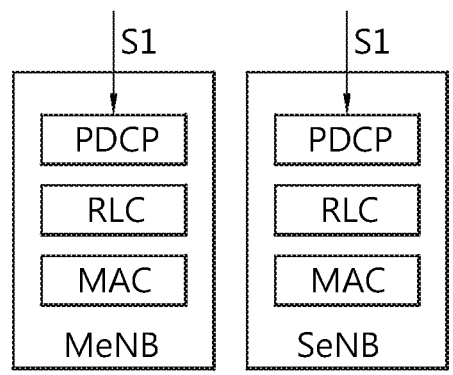
FIG. 9 shows an example of U-plane architecture for dual connectivity.

FIG. 9 shows an example of U-plane architecture for dual connectivity. U-plane architecture for dual connectivity shown in FIG. 9 is the combination of S1-U that terminates in SeNB and independent PDCPs (no bearer split). U-plane architecture for dual connectivity shown in FIG. 9 may be called "Architecture 1A".

Figure 10:
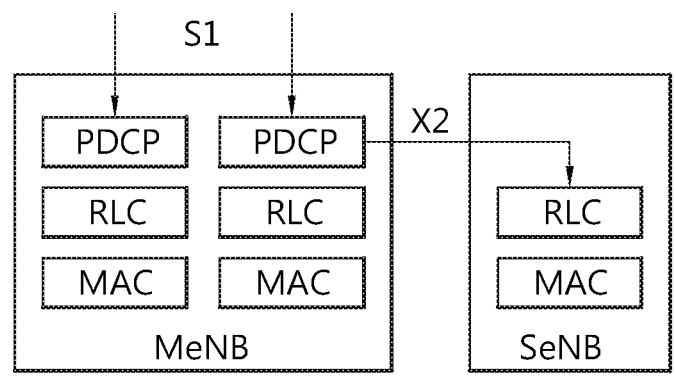
FIG. 10 shows another example of U-plane architecture for dual connectivity.

FIG. 10 shows another example of U-plane architecture for dual connectivity. U-plane architecture for dual connectivity shown in FIG. 10 is the combination of S1-U that terminates in MeNB, bearer split in MeNB, and independent RLCs for split bearers. U-plane architecture for dual connectivity shown in FIG. 10 may be called "Architecture 3C".

Figure 11:
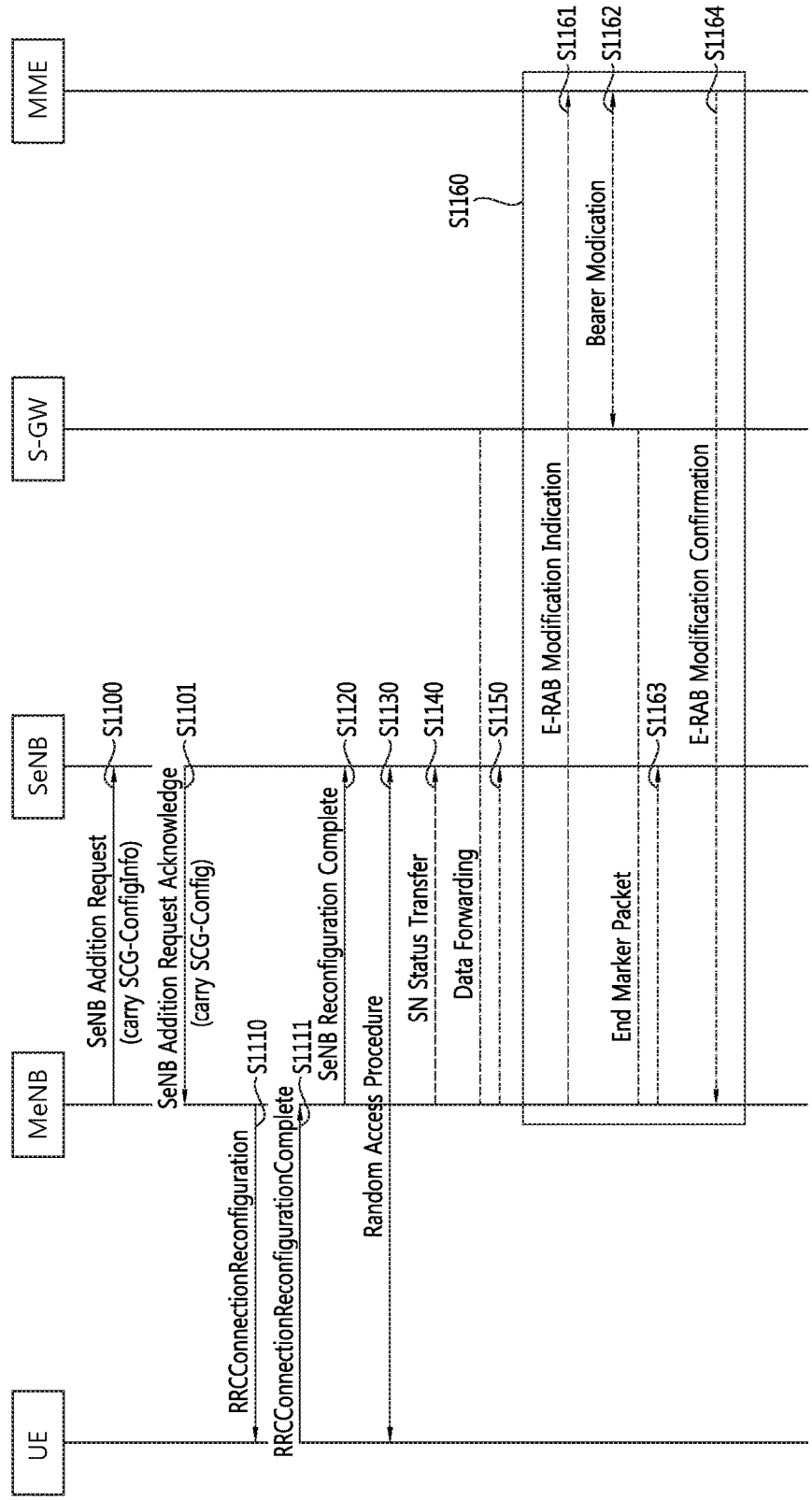
FIG. 11 shows an example of a SeNB addition procedure.

FIG. 11 shows an example of a SeNB addition procedure. The SeNB addition procedure is initiated by the MeNB and is used to establish a UE context at the SeNB in order to provide radio resources from the SeNB to the UE. This procedure is used to add at least the first cell (i.e. PSCell) of the SCG.

In step S1100, the MeNB decides to request the SeNB to allocate radio resources for a specific E-UTRAN radio access bearer (E-RAB), indicating E-RAB characteristics (E-RAB parameters, transport layer network (TNL) address information corresponding to the UP option). In addition, the MeNB indicates within SCG-ConfigInfo the MCG configuration (including security algorithm for SCG bearer) and the entire UE capabilities for UE capability coordination to be used as basis for the reconfiguration by the SeNB, but does not include SCG configuration. The MeNB can provide the latest measurement results for the SCG cell(s) requested to be added. The SeNB may reject the request. In contrast to SCG bearer, for the split bearer option, the MeNB may either decide to request resources from the SeNB of such an amount, that the quality of service (QoS) for the respective E-RAB is guaranteed by the exact sum of resources provided by the MeNB and the SeNB together, or even more. The MeNBs decision may be reflected in step S1101 below by the E-RAB parameters signalled to the SeNB, which may differ from E-RAB parameters received over S1. The MeNB may request the direct establishment of SCG or split bearer, i.e., without via MCG bearer.

If the radio resource management (RRM) entity in the SeNB is able to admit the resource request, the SeNB allocates respective radio resources and, dependent on the bearer option, respective transport network resources. The SeNB triggers random access so that synchronization of the SeNB radio resource configuration can be performed. In step S1101, the SeNB provides the new radio resource of SCG in SCG-Config to the MeNB. For SCG bearers, together with S1 DL TNL address information for the respective E-RAB and security algorithm, for split bearers X2 DL TNL address information. In case of split bearers, transmission of user plane data may take place after step S1101. In case of SCG bearers, data forwarding and the SN Status Transfer may take place after step S1101.

If the MeNB endorses the new configuration, in step S1110, the MeNB sends the RRCConnectionReconfiguration message to the UE including the new radio resource configuration of SCG according to the SCG-Config. The UE applies the new configuration, and in step S1111, replies with RRCConnectionReconfigurationComplete message. In case the UE is unable to comply with (part of) the configuration included in the RRCConnectionReconfiguration message, the UE performs the reconfiguration failure procedure.

In step S1120, the MeNB informs the SeNB that the UE has completed the reconfiguration procedure successfully.

In step S1130, the UE performs synchronization towards the PSCell of the SeNB. The order the UE sends the RRCConnectionReconfigurationComplete message and performs the random access procedure towards the SCG is not defined. The successful RA procedure towards the SCG is not required for a successful completion of the RRC connection reconfiguration procedure.

In case SCG bearers, and dependent on the bearer characteristics of the respective E-RAB, the MeNB may take actions to minimise service interruption due to activation of dual connectivity (data forwarding in step S1140, SN status transfer in step S1150).

In step S1160, for SCG bearers, the path update procedure towards the EPC is performed. Specifically, in step S1161, the MeNB may transmit the E-RAB modification indication message to the MME. In step S1162, the MME and S-GW may perform bearer modification. In step S1163, end marker packet may be exchanged between S-GW and MeNB/SeNB. In step S1164, the MME may transmit the E-RAB the E-RAB modification confirmation message to the MeNB.

Figure 12:
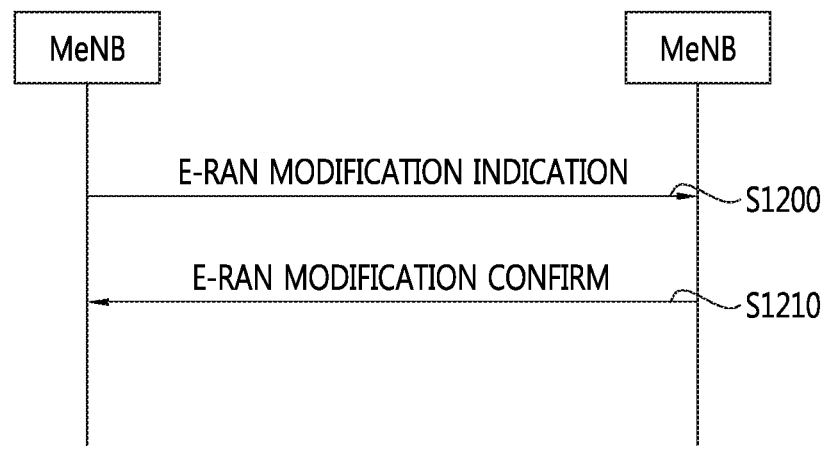
FIG. 12 shows an E-RAB modification indication procedure.

FIG. 12 shows an E-RAB modification indication procedure. The E-RAB modification indication procedure corresponds to step S1161 and S1164 of FIG. 11. The purpose of the E-RAB modification indication procedure is to enable the eNB to request modifications of already established E-RABs for a given UE. The procedure uses UE-associated signaling.

In step S1200, the eNB initiates the procedure by sending an E-RAB Modification Indication message to the MME. The Transport Layer Address information element (IE) and DL GTP TEID IE included in the E-RAB To Be Modified Item IEs IE in the E-RAB Modification Indication message shall be considered by the MME as the new DL address of the E-RABs. The Transport Layer Address IE and DL GTP TEID IE included in the E-RAB Not To Be Modified Item IEs IE in the E-RAB Modification Indication message shall be considered by the MME as the E-RABs with unchanged DL address.

Table 1 shows an example of the E-RAB Modification Indication message. This message is sent by the eNB and is used to request the MME to apply the indicated modification for one or several E-RABs.

TABLE 1

| IE/Group Name | Presence | Range | IE type and reference | Semantics description | Criticality | Assigned Criticality |
|---|---|---|---|---|---|---|
| Message Type | M | | 9.2.1.1 | | YES | reject |
| MME UE S1AP ID | M | | 9.2.3.3 | | YES | reject |
| eNB UE S1AP ID | M | | 9.2.3.4 | | YES | reject |
| E-RAB to be Modified List | | 1 | | | YES | reject |
| >E-RAB to Be Modified Item IEs | | 1 ... <maxnoofE-RABs> | | | EACH | reject |
| >>E-RAB ID | M | | 9.2.1.2 | | — | |
| >>Transport Layer Address | M | | 9.2.2.1 | | — | |
| >>DL GTP TEID | M | | GTP-TEID 9.2.2.2 | | — | |
| E-RAB not to be Modified List | | 0 ... 1 | | | YES | reject |
| >E-RAB not to Be Modified Item IEs | | 1 ... <maxnoofE-RABs> | | | EACH | reject |
| >>E-RAB ID | M | | 9.2.1.2 | | — | |
| >>Transport Layer Address | M | | 9.2.2.1 | | — | |
| >>DL GTP TEID | M | | GTP-TEID 9.2.2.2 | | — | |

In step S1210, the MME transmits an E-RAB Modification Confirmation message to the eNB. The E-RAB Modification Confirmation message shall contain the result for all the E-RABs that were requested to be modified according to the E-RAB To Be Modified Item IEs IE of the E-RAB Modification Indication message as follows:
  A list of E-RABs which are successfully modified shall be included in the E-RAB Modify List IE.
  A list of E-RABs which failed to be modified, if any, shall be included in the E-RAB Failed to Modify List IE.
  If the E-RAB Failed to Modify List IE is received in the E-RAB Modification Confirmation message, the eNB shall either:
    release all corresponding E-UTRA and E-UTRAN resources for the concerned E-RAB or
    keep the previous transport information before sending the E-RAB Modification Indication message unchanged for the concerned E-RAB.
  When the MME reports unsuccessful modification of an E-RAB, the cause value should be precise enough to enable the eNB to know the reason for an unsuccessful modification.
  Table 2 shows an example of the E-RAB Modification Confirmation message. This message is sent by the MME and is used to report the outcome of the request from the E-RAB Modification Indication message.

embodiment of the present invention. According to this embodiment of the present invention, after the MeNB makes a decision to add a SeNB, which is a HeNB, then the MeNB starts the SeNB addition procedure as follows.

In step S1400, the MeNB transmits the SeNB Addition Request message with a closed subscriber group (CSG) membership status indication, which indicates the CSG membership status of the UE, to the target SeNB, i.e. HeNB. The CSG membership status indication may be CSG Membership Status Indication IE. Or, the CSG membership status indication may be transmitted via a new message or the other existing message.

Upon receiving the CSG membership status indication, the SeNB (HeNB) trusts the CSG membership status of the UE indicated by the received CSG membership status indication. In step S1401, the SeNB (HeNB) transmits the SeNB Addition Request Acknowledge message, together with CSG ID and/or cell access mode of the target cell served by the SeNB (HeNB) and/or the PLMN ID of the target cell served by the SeNB (HeNB), to the MeNB. Or, CSG ID and/or cell access mode of the target cell and/or the PLMN

TABLE 2

| IE/Group Name | Presence | Range | IE type and reference | Semantics description | Criticality | Assigned Criticality |
|---|---|---|---|---|---|---|
| Message Type | M | | 9.2.1.1 | | YES | reject |
| MME UE S1AP ID | M | | 9.2.3.3 | | YES | ignore |
| eNB UE S1AP ID | M | | 9.2.3.4 | | YES | ignore |
| E-RAB Modify List | | 0 ... 1 | | | YES | ignore |
| >E-RAB Modify Item IEs | | 1 ... <maxnoofE-RABs> | | | EACH | ignore |
| >>E-RAB ID | M | | 9.2.1.2 | | — | |
| E-RAB Failed to Modify List | O | | E-RAB List 9.2.1.36 | A value for E-RAB ID shall only be present once in E-RAB Modify List IE + E-RAB Failed to Modify List IE. | YES | ignore |
| Criticality Diagnostics | O | | 9.2.1.21 | | YES | ignore |

Figure 13:
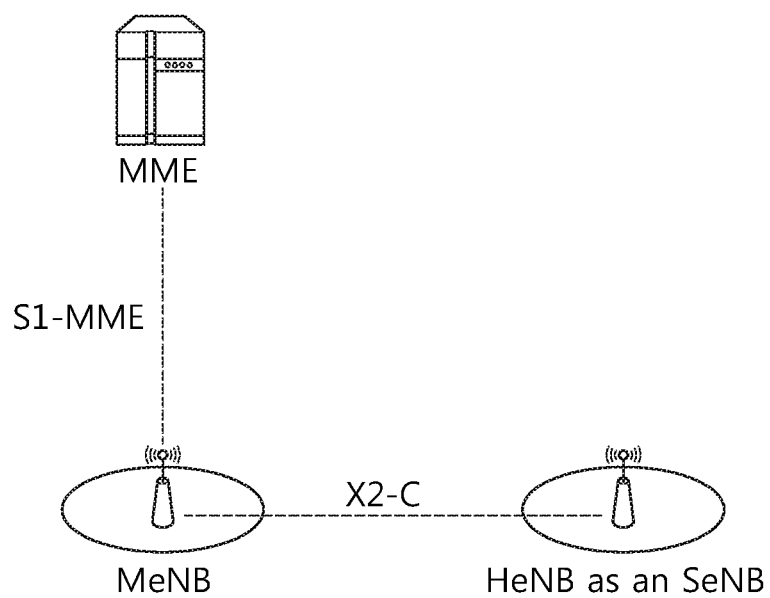
FIG. 13 shows dual connectivity when a HeNB takes role of a SeNB.

FIG. 13 shows dual connectivity when a HeNB takes role of a SeNB. The HeNB has been specified with both S1 and X2 mobility possible from 3GPP LTE rel-8 to rel-12, which may be a typical SeNB. Thus dual connectivity with Macro eNB, as a MeNB, and HeNB, as a SeNB, is a considerable feature for dual connectivity enhancement. However, the HeNB has three modes (i.e. open mode, hybrid mode, closed mode), which makes dual connectivity a little bit more complicated. For example, access control and/or membership verification problem still exists in dual connectivity.

In order to solve the problem described above, a method for performing access control and/or membership verification for dual connectivity according to an embodiment of the present invention is described below.

Figure 14:
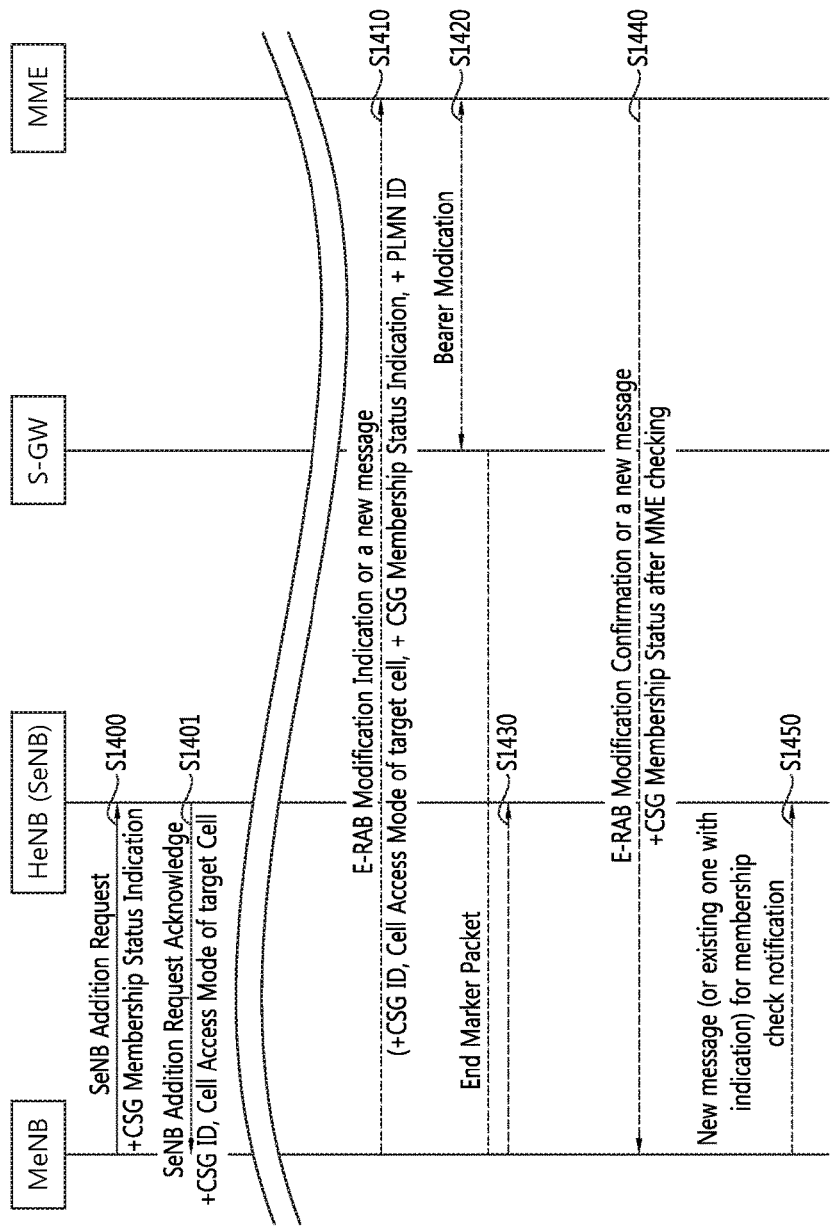
FIG. 14 shows an example of a method for performing access control and/or membership verification for dual connectivity according to an embodiment of the present invention.

FIG. 14 shows an example of a method for performing access control and/or membership verification for dual connectivity according to an embodiment of the present invention. It is assumed that the embodiment of FIG. 14 is based on the SeNB addition procedure which is shown in FIG. 11, however, the embodiment of the present invention is not limited thereto. Other procedures may be used for the ID of the target cell served by the SeNB (HeNB) may be transmitted via a new message or the other existing message.

Thereafter, steps S1110 to S1150 of FIG. 11 may be performed as it is, since there is no change for those steps.

In step S1410, the MeNB transmits the E-RAB Modification Indication message with CSG ID and/or cell access mode of the target cell and/or CSG membership status indication and/or the PLMN ID of the target cell served by the SeNB (HeNB) to the MME, which will verify the CSG membership status of the UE. Or, CSG ID and/or cell access mode of the target cell and/or CSG membership status indication and/or the PLMN ID of the target cell served by the SeNB (HeNB) may be transmitted via a new message or the other existing message. Step S1410 may be applied only to architecture 1A for dual connectivity shown in FIG. 9. For architecture 3C for dual connectivity shown in FIG. 10, step S1410 may not be necessary. Therefore, for architecture 3C for dual connectivity, the MeNB may transmit the E-RAB Modification Indication message (or a new message or other existing message) with CSG ID and/or cell access mode of the target cell and/or CSG membership status indication and/or the PLMN ID of the target cell served by the SeNB (HeNB) to the MME earlier.

For split bearer option, the E-RAB Modification Indication message shown in Table 1 may be modified according to Table 3 below, in order to indicate the MME to ignore the modification about DL GTP ID and Transport Layer Address. Table 3 shows an example of the E-RAB Modification Indication message according to an embodiment of the present invention.

status of the UE. If the UE passes the verification, in step S1440, the MME transmits the E-RAB Modification Confirmation message with the verified CSG membership status of the UE to the MeNB. Or, the verified CSG membership status of the UE may be transmitted via a new message or the other existing message. Step S1440 may be applied only to architecture 1A for dual connectivity. For architecture 3C

TABLE 3

| IE/Group Name | Presence | Range | IE type and reference | Semantics description | Criticality | Assigned Criticality |
|---|---|---|---|---|---|---|
| Message Type | M | | 9.2.1.1 | | YES | reject |
| MME UE S1AP ID | M | | 9.2.3.3 | | YES | reject |
| eNB HE S1AP ID | M | | 9.2.3.4 | | YES | reject |
| E-RAB to be Modified List | | 1 | | | YES | reject |
| >E-RAB to Be Modified Item IEs | | 1 ... \<maxnoofE-RABs\> | | | EACH | reject |
| >>E-RAB ID | M | | 9.2.1.2 | | — | |
| >>Transport Layer Address | M | | 9.2.2.1 | | — | |
| >>DL GTP TEID | M | | GTP-TEID 9.2.2.2 | | — | |
| >> Indication of ignoring the modification | O | | | To tell MME this bearer is not really to be modified, this is for split bearer | | |
| E-RAB not to be Modified List | | 0 ... 1 | | | YES | reject |
| >E-RAB not to Be Modified Item IEs | | 1 ... \<maxoofE-RABs\> | | | EACH | reject |
| >>E-RAB ID | M | | 9.2.1.2 | | — | |
| >>Transport Layer Address | M | | 9.2.2.1 | | — | |
| >>DL GTP TEID | M | | GTP-TEID 9.2.2.2 | | — | |

If the Indication of ignoring the modification IE is included in the E-RAB Modification Indication message, the MME may not treat the Transport Layer Address and DL GTP TEID IEs for the same E-RAB as to be modified, which is not really modified for split bearer option.

In step S1420, the MME and S-GW may perform bearer modification. In step S1430, end marker packet may be exchanged between S-GW and MeNB/SeNB (HeNB).

Upon receiving the CSG ID and/or cell access mode of the target cell and/or CSG membership status indication and/or the PLMN ID of the target cell served by the SeNB (HeNB) from the MeNB, the MME verifies the CSG membership for dual connectivity, step S1440 may not be necessary. Therefore, for architecture 3C for dual connectivity, the MeNB may transmit the E-RAB Modification Confirmation message (or a new message or other existing message) with the verified CSG membership status of the UE to the MeNB earlier.

For split bearer option, the E-RAB Modification Confirmation message shown in Table 2 may be modified according to Table 4 below, as a response to the E-RAB Modification Indication message shown in Table 3. Table 4 shows an example of the E-RAB Modification Confirmation message according to an embodiment of the present invention.

TABLE 4

| IE/Group Name | Presence | Range | IE type and reference | Semantics description | Criticality | Assigned Criticality |
|---|---|---|---|---|---|---|
| Message Type | M | | 9.2.1.1 | | YES | reject |
| MME UE S1AP ID | M | | 9.2.3.3 | | YES | ignore |
| eNb UE S1AP ID | M | | 9.2.3.4 | | YES | ignore |
| E-RAB Modify List | | 0 ... 1 | | | YES | ignore |
| >E-RAB Modify Item IEs | | 1 ... \<maxnoofE-RABs\> | | | EACH | ignore |
| >>E-RAB ID | M | | 9.2.1.2 | | — | |

TABLE 4-continued

| IE/Group Name | Presence | Range | IE type and reference | Semantics description | Criticality | Assigned Criticality |
|---|---|---|---|---|---|---|
| >> Indication of split bearer | O | | | As an response of new IE in the table above | | |
| E-RAB Failed to Modify List | O | | E-RAB List 9.2.1.36 | A value for E-RAB ID shall only be present once in E-RAB Modify List IE + E-RAB failed to Modify List IE. | YES | ignore |
| Criticality Diagnostics | O | | 9.2.1.21 | | YES | ignore |

The corresponding E-RAB shall be included in the E-RAB Modify List IE of the E-RAB Modification Confirm message, which may be realized with a new indication.

Alternatively, if the UE does not pass the verification, in step S1440, the MME may transmit a failure message (or a new message or other existing message) with the verified CSG membership status of the UE to the MeNB. Or, the MME may transmit the E-RAB Modification Confirmation message (or a new message or other existing message) with the CSG membership status, which indicates that the UE is not a member. Step S1440 may be applied only to architecture 1A for dual connectivity. For architecture 3C for dual connectivity, step S1440 may not be necessary. Therefore, for architecture 3C for dual connectivity, the MeNB may transmit the failure message (or a new message or other existing message) with the verified CSG membership status of the UE to the MeNB earlier.

In step S1450, the MeNB may transmit a new message (or existing message with new IEs) to notify the SeNB of the final CSG membership status of the UE. If the target cell is hybrid mode, the SeNB may treat the UE as a member when CSG membership status is true. Otherwise, the SeNB may downgrade the UE as a non-member or disconnect the UE, and the SeNB may update the UE context for this UE about the CSG membership status. If the target cell is close mode, the SeNB may treat the UE as a member when CSG membership status is true. Otherwise, the SeNB may release this bearer.

If the verification failure happens, i.e. the UE does not pass the verification, in step S1450, the MeNB initiates SeNB release with a cause value to indicate the SeNB the reason of the failure. Or, the MeNB may indicate the SeNB to treat the UE as a non-member.

Figure 15:
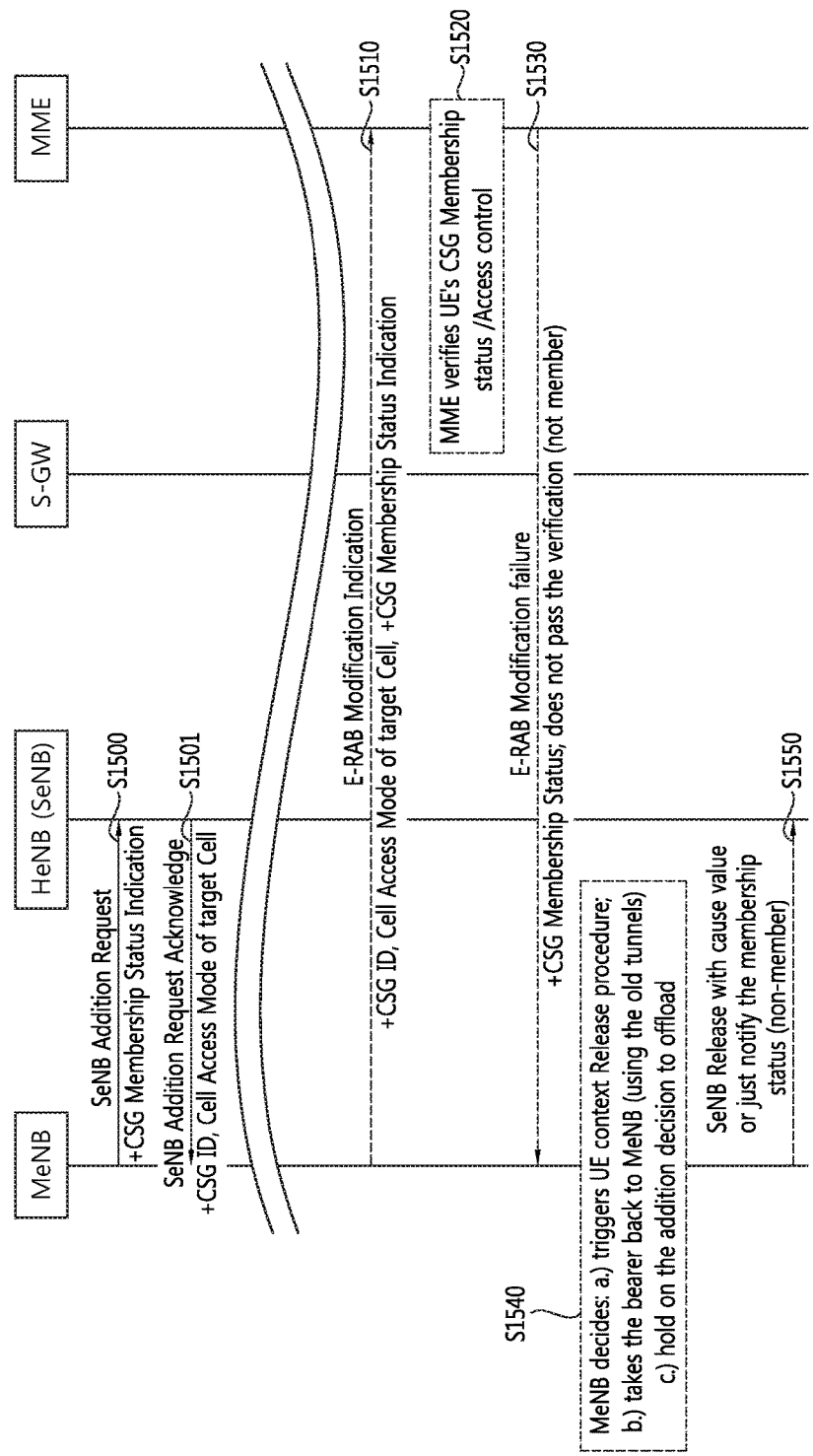
FIG. 15 shows another example of a method for performing access control and/or membership verification for dual connectivity according to an embodiment of the present invention.

FIG. 15 shows another example of a method for performing access control and/or membership verification for dual connectivity according to an embodiment of the present invention. FIG. 15 corresponds to a case when the verification failure happens. Steps S1500 to S1510 are the same as steps S1400 to S1410 of FIG. 14.

In step S1520, the MME verifies the CSG membership status of the UE and/or performs access control.

If the verification failure happens for the UE, in step S1530, the MME transmits a failure message (e.g., E-RAB Modification Failure message or other message) with the verified CSG membership status, which indicates a non-member, to the MeNB. Or, the MME may transmit the E-RAB Modification Confirmation message with the CSG membership status, which indicates that the UE is not a member. For architecture 3C for dual connectivity, step S1510 and S1530 may be means totally new messages. The MME may not trigger the Dedicated Bearer Deactivation procedure for the corresponding E-RABs to the SeNB (membership verification failed).

Upon receiving the E-RAB Failure message, in step S1540, the MeNB may perform one of the followings.

(1) The MeNB may trigger the S1 UE Context Release procedure, upon which all of UE bearers may be released.

(2) If the MeNB adds bearer to the SeNB, the MeNB may cancel the addition decision, which means that the MeNB keeps serving the E-RABs with the old GPRS tunneling protocol (GTP) tunnels.

(3) If the SeNB is a hybrid mode, the MeNB may hold on the addition decision and offload the E-RAB to the SeNB, which may treat the UE as a non-member.

In step S1550, the MeNB may transmit the SeNB Release message or X2 UE Context Release message to the SeNB with cause value to notify the SeNB. Alternatively, in step S1550, the MeNB may notify the SeNB the CSG membership status of the UE if the SeNB is a hybrid mode. Accordingly, the SeNB may treat the UE as a non-member.

Figure 16:
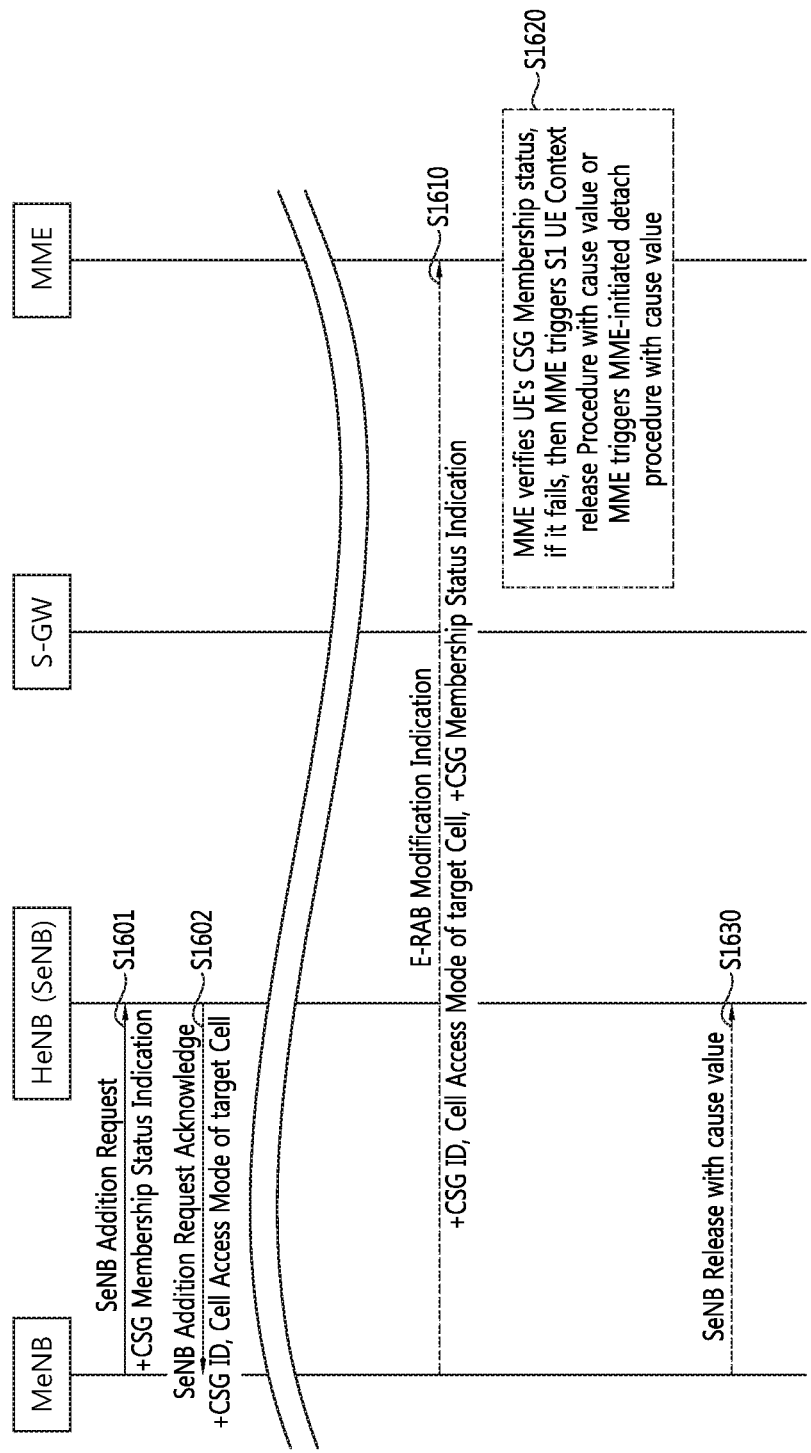
FIG. 16 shows another example of a method for performing access control and/or membership verification for dual connectivity according to an embodiment of the present invention.

FIG. 16 shows another example of a method for performing access control and/or membership verification for dual connectivity according to an embodiment of the present invention. FIG. 16 also corresponds to a case when the verification failure happens. Steps S1600 to S1610 are the same as steps S1400 to S1410 of FIG. 14.

In step S1620, the MME verifies the CSG membership status of the UE and/or performs access control. If the verification failure happens for the UE, the MME may trigger the S1 UE Context Release procedure directly with cause value, upon which all of UE bearers may be released. Or, the MME may trigger the MME-initiated detach procedure with cause value. The cause value may indicate the CSG membership verification/access control failure.

In step S1630, the MeNB may transmit the SeNB Release message or X2 UE Context Release message to the SeNB with cause value to notify the SeNB.

Figure 17:
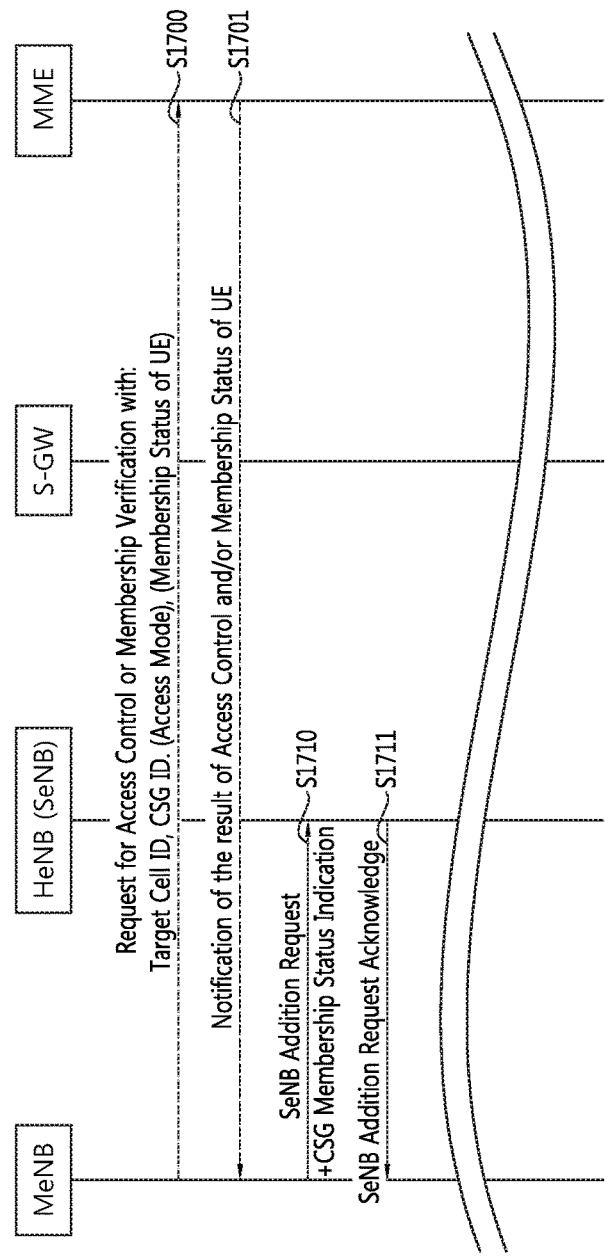
FIG. 17 shows another example of a method for performing access control and/or membership verification for dual connectivity according to an embodiment of the present invention.

FIG. 17 shows another example of a method for performing access control and/or membership verification for dual connectivity according to an embodiment of the present invention. It is assumed that the embodiment of FIG. 17 is also based on the SeNB addition procedure which is shown in FIG. 11, however, the embodiment of the present invention is not limited thereto. Other procedures may be used for the embodiment of the present invention. According to this embodiment of the present invention, after the MeNB makes a decision to add a SeNB, which is a HeNB, the MeNB first initiates the request of access control and/or membership verification to the MME and then starts the SeNB addition procedure as follows.

In step S1700, the MeNB transmits the request of access control or membership verification with target cell ID, CSG ID, and/or access mode of the target cell, and/or CSG membership status of the UE (reported by the UE) to the MME. The target cell ID, CSG ID, and/or access mode of the target cell may be obtained by the MeNB through the X2 setup request/response messages earlier. Then, the MME may perform access control or membership verification.

In step S1710, after verifying the CSG membership status of the UE, the MME notifies the verified result about whether the UE passes the access control or not to the MeNB. That is, the MME may transmit the CSG membership status of the UE, which indicates that the UE is a member or not a member. The verified result may be transmitted via an existing message, or a new message, or an IE in the existing/new message.

In step S1720, the MeNB transmits the SeNB Addition Request message with a CSG membership status indication to the SeNB (HeNB). The CSG membership status indication indicates that the UE is a member or not a member, which is indicated by the received verified result. The CSG membership status indication may be CSG Membership Status Indication IE. Accordingly, the SeNB (HeNB) may treat the UE as a member or non-member, depending on the received CSG membership status indication.

Then, the normal SeNB addition procedure may be performed. That is, steps S1101 to S1164 of FIG. 11 may be performed as it is, since there is no change for those steps.

Figure 18:
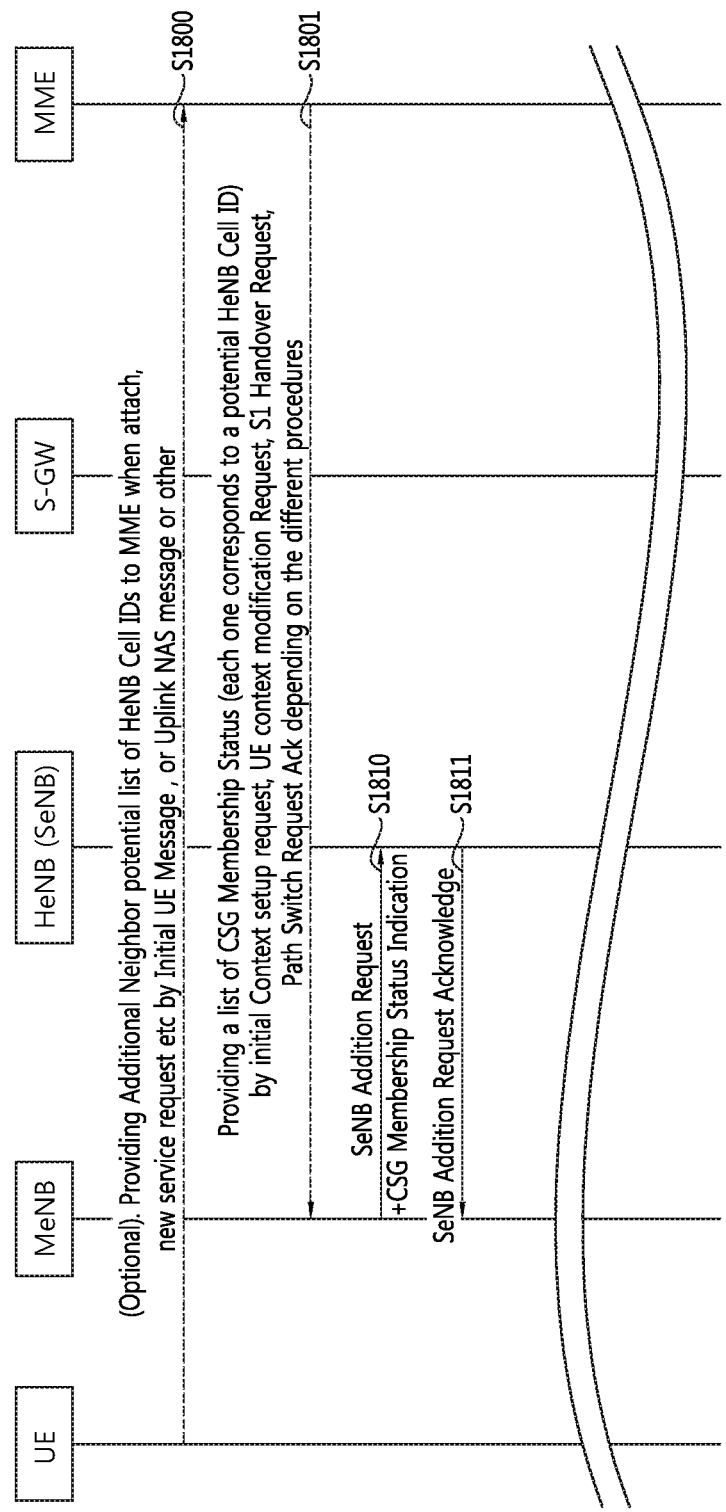
FIG. 18 shows another example of a method for performing access control and/or membership verification for dual connectivity according to an embodiment of the present invention.

FIG. 18 shows another example of a method for performing access control and/or membership verification for dual connectivity according to an embodiment of the present invention. According to this embodiment of the present invention, the MeNB may get list of CSG membership status of the UE, which corresponds to each neighbor HeNB cell of the MeNB. Specifically, the MeNB may get the list of neighbor HeNB cell IDs, and/or CSG IDs, and/or list of access modes of the HeNB cell through X2 Setup/Response messages.

In step S1800, the MeNB may provide the list of CSG membership status of the UE to the MME by Initial UE message, Uplink NAS message or other messages, when the UE attaches, or request a new service or other procedures. Or, the MME may have the neighbor HeNB cell IDs of the MeNB, and/or CSG IDs, and/or list of access modes of the HeNB cell.

Upon receiving the list of CSG membership status of the UE, the MME checks the CSG membership status of the UE, which corresponds to each HeNB cell ID. In step S1810, the MME may provide the whole list of the CSG membership status of the UE to the MeNB by one of the Initial Context Setup Request message, UE Context Modification Request message, S1 Handover Request message, Path Switch Request Acknowledge message or other messages depending on different procedures.

Upon receiving the list of the CSG membership status of the UE, the MeNB may keep the list and be ready to use it later, depending on to which target cell the MeNB will perform the SeNB addition procedure. In step S1820, the MeNB transmits the SeNB Addition Request message with a CSG membership status indication to the SeNB (HeNB). Then, the normal SeNB addition procedure may be performed. That is, steps S1101 to S1164 of FIG. 11 may be performed as it is, since there is no change for those steps.

Figure 19:
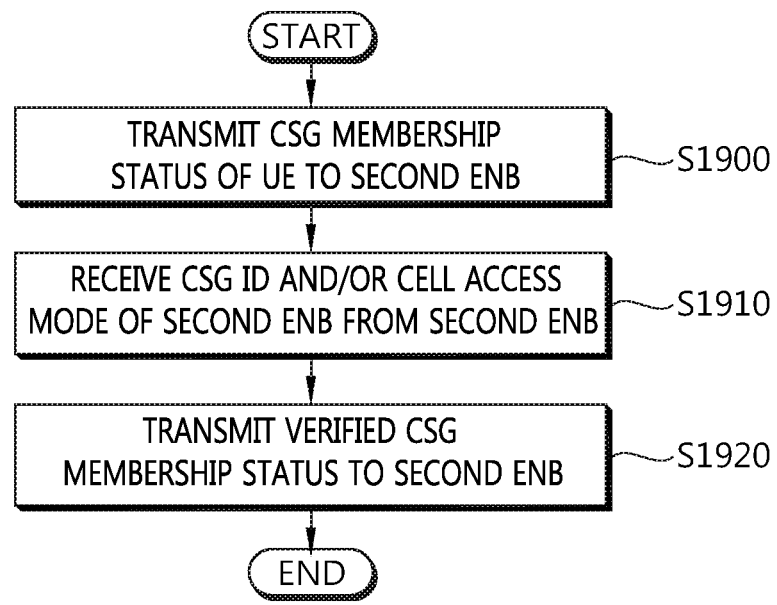
FIG. 19 shows an example of a method for performing access control according to an embodiment of the present invention.

FIG. 19 shows an example of a method for performing access control according to an embodiment of the present invention.

In step S1900, the first eNB transmits a CSG membership status of a UE to a second eNB, which is a HeNB. The CSG membership status of the UE may be transmitted via a SeNB addition request message.

In step S1910, the first eNB receives at least one of a CSG ID or a cell access mode of the second eNB from the second eNB. The at least one of the CSG ID or the cell access mode of the second eNB may be received via a SeNB addition request acknowledge message. The cell access mode of the second eNB may be a hybrid mode.

The first eNB may further transmit at least one of the CSG ID, the cell access mode of the second eNB, or the CSG membership status of the UE to a MME, via an E-RAB modification indication message. The E-RAB modification indication message may include an indication of ignoring modification of E-RABs for split bearer for dual connectivity. The first eNB may further receive a verified CSG membership status of the UE from a MME, via an E-RAB modification confirmation message.

In step S1920, the first eNB transmits the verified CSG membership status of the UE to the second eNB.

Figure 20:
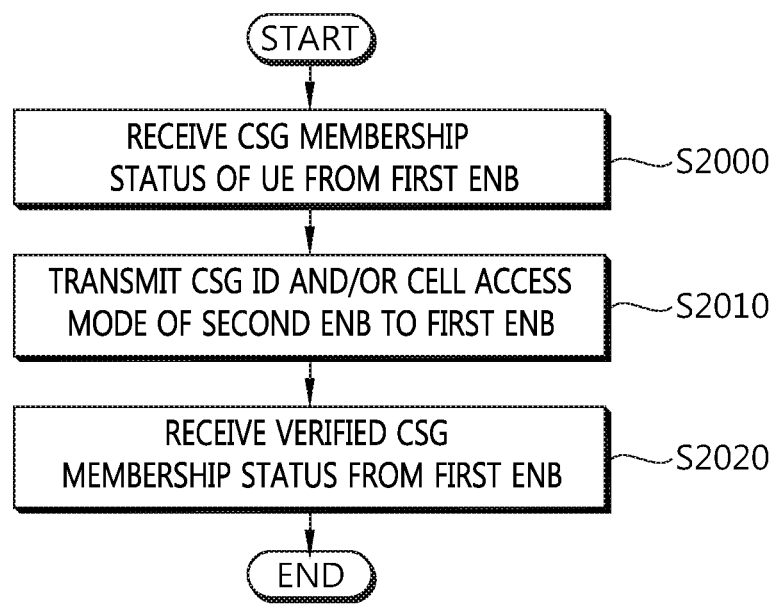
FIG. 20 shows another example of a method for performing access control according to an embodiment of the present invention.

FIG. 20 shows another example of a method for performing access control according to an embodiment of the present invention.

In step S2000, the second eNB, which is a HeNB, received a CSG membership status of a UE from a first eNB. The CSG membership status of the UE may be received via a SeNB addition request message.

In step S2010, the second eNB transmits at least one of a CSG ID or a cell access mode of the second eNB to the first eNB. The at least one of the CSG ID or the cell access mode of the second eNB may transmitted received via a SeNB addition request acknowledge message. The cell access mode of the second eNB may be a hybrid mode.

In step S2010, the second eNB receives a verified CSG membership status of the UE from the first eNB. The second eNB may treat the UE as a member when the CSG membership status of the UE and the verified CSG membership status of the UE are identical. Or, the second eNB may treat the UE as a non-member when the CSG membership status of the UE and the verified CSG membership status of the UE are not identical.

Figure 21:
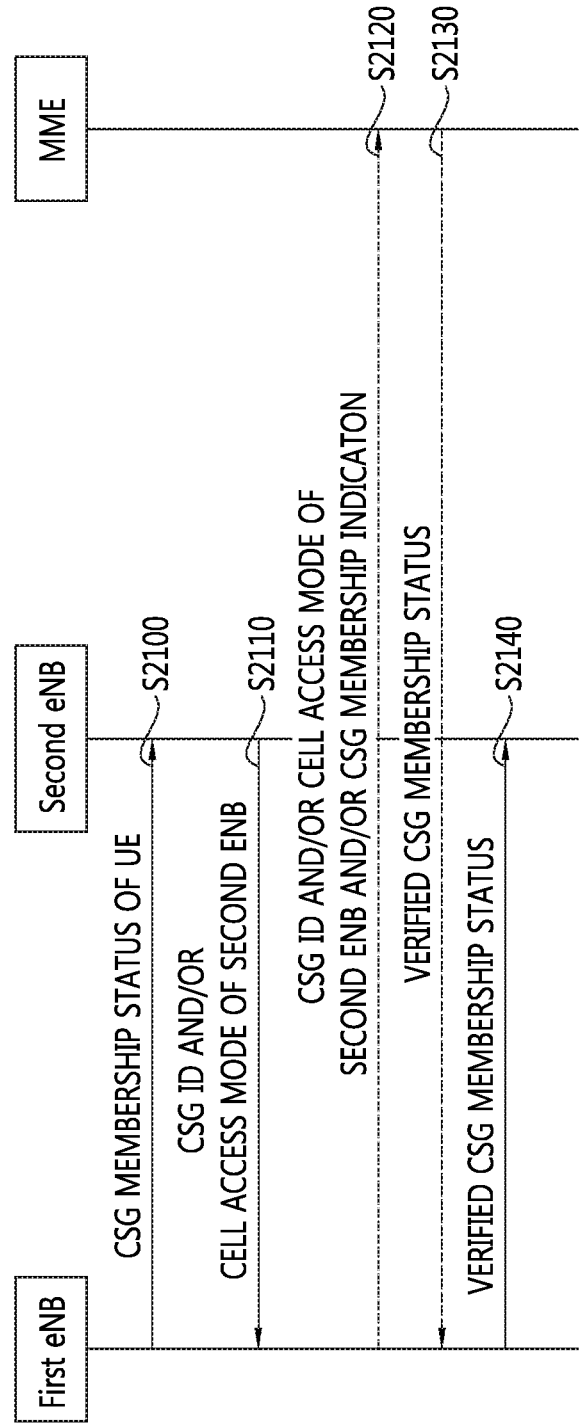
FIG. 21 shows an example of a method for performing access control according to an embodiment of the present invention.

FIG. 21 shows an example of a method for performing access control according to an embodiment of the present invention.

In step S2100, the first eNB transmits a CSG membership status of a UE to a second eNB, which is a HeNB. The CSG membership status of the UE may be transmitted via a SeNB addition request message.

In step S2110, the second eNB transmits at least one of a CSG ID or a cell access mode of the second eNB from the second eNB. The at least one of the CSG ID or the cell access mode of the second eNB may be transmitted via a SeNB addition request acknowledge message. The cell access mode of the second eNB may be a hybrid mode.

In step S2120, the first eNB may transmit at least one of the CSG ID, the cell access mode of the second eNB, or the CSG membership status of the UE to a MME via an E-RAB modification indication message. The E-RAB modification indication message may include an indication of ignoring modification of E-RABs for split bearer for dual connectivity.

In step S2130, the MME may receive a verified CSG membership status of the UE from the MME via an E-RAB modification confirmation message.

In step S2140, the first eNB transmits the verified CSG membership status of the UE to the second eNB.

Figure 22:
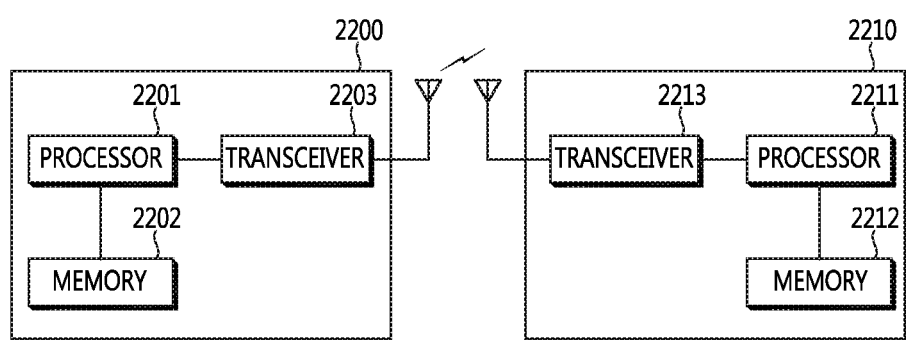
FIG. 22 shows a wireless communication system to implement an embodiment of the present invention.

FIG. 22 shows a wireless communication system to implement an embodiment of the present invention.

A MeNB 2200 includes a processor 2201, a memory 2202, and a transceiver 2203. The processor 2201 may be configured to implement proposed functions, procedures, and/or methods in this description. Layers of the radio interface protocol may be implemented in the processor 2201. The memory 2202 is operatively coupled with the processor 2201 and stores a variety of information to operate the processor 2201. The transceiver 2203 is operatively coupled with the processor 2201, and transmits and/or receives a radio signal.

A SeNB or MME 2210 includes a processor 2211, a memory 2212 and a transceiver 2213. The processor 2211 may be configured to implement proposed functions, procedures and/or methods described in this description. Layers of the radio interface protocol may be implemented in the processor 2211. The memory 2212 is operatively coupled with the processor 2211 and stores a variety of information to operate the processor 2211. The transceiver 2213 is operatively coupled with the processor 2211, and transmits and/or receives a radio signal.

The processors 2201, 2211 may include application-specific integrated circuit (ASIC), other chipset, logic circuit and/or data processing device. The memories 2202, 2212 may include read-only memory (ROM), random access memory (RAM), flash memory, memory card, storage medium and/or other storage device. The transceivers 2203, 2213 may include baseband circuitry to process radio frequency signals. When the embodiments are implemented in software, the techniques described herein can be implemented with modules (e.g., procedures, functions, and so on) that perform the functions described herein. The modules can be stored in memories 2202, 2212 and executed by processors 2201, 2211. The memories 2202, 2212 can be implemented within the processors 2201, 2211 or external to the processors 2201, 2211 in which case those can be communicatively coupled to the processors 2201, 2211 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What is claimed is:

1. A method performed by a second base station in a wireless communication system, the method comprising:

establishing a dual connectivity between a user equipment (UE) and each of a first base station and the second base station, the establishing comprising:

receiving a secondary node addition request message including a closed subscriber group (CSG) membership status of the UE directly from the first base station;

trusting the CSG membership status of the UE; and transmitting a secondary node addition request acknowledge message directly to the first base station as a response to the secondary node addition request message; and after establishing the dual connectivity in which the UE is connected to both the first base station and the second base station:

receiving a verified CSG membership status of the UE from the first base station, wherein the verified CSG membership status of the UE is first received by the first base station from a core network node which verifies the CSG membership status of the UE received from the first base station; and updating the CSG membership status of the UE based on the verified CSG membership status of the UE.

2. The method of claim 1, wherein the first base station is a master eNB (MeNB) in the dual connectivity, and wherein the second base station is a secondary eNB (SeNB) in the dual connectivity.

3. The method of claim 2, wherein the SeNB is a home eNB (HeNB) which serves a hybrid cell.

4. The method of claim 1, wherein the core network node is a mobility management entity (MME).

5. The method of claim 1, wherein the secondary node addition request message is a SeNB Addition Request message, and wherein the secondary node addition request acknowledge message is a SeNB Addition Request Acknowledge message.

6. A second base station in a wireless communication system, the second base station comprising:

a memory;

a transceiver; and a processor, operably coupled to the memory and the transceiver, and configured to:

establish a dual connectivity between a user equipment (UE) and each of a first base station and the second base station, wherein the dual connectivity is established by:

controlling the transceiver to receive a secondary node addition request message including a closed subscriber group (CSG) membership status of the UE directly from the first base station;

trusting the CSG membership status of the UE; and controlling the transceiver to transmit a secondary node addition request acknowledge message directly to the first base station as a response to the secondary node addition request message; and after establishing the dual connectivity in which the UE is connected to both the first base station and the second base station:

control the transceiver to receive a verified CSG membership status of the UE from the first base station, wherein the verified CSG membership status of the UE is first received by the first base station from a core network node which verifies the CSG membership status of the UE received from the first base station; and update the CSG membership status of the UE based on the verified CSG membership status of the UE.

7. The second base station of claim 6,
wherein the first base station is a master eNB (MeNB) in the dual connectivity, and
wherein the second base station is a secondary eNB (SeNB) in the dual connectivity.

8. The second base station of claim 7, wherein the SeNB is a home eNB (HeNB) which serves a hybrid cell.

9. The second base station of claim 6, wherein the core network node is a mobility management entity (MME).

10. The second base station of claim 6,
wherein the secondary node addition request message is a SeNB Addition Request message, and
wherein the secondary node addition request acknowledge message is a SeNB Addition Request Acknowledge message.

* * * * *